June 13, 1967  H. L. SULLIVAN  3,325,192
FLARELESS TUBE COUPLING NUT AND FERRULE ASSEMBLY
Original Filed Dec. 28, 1960
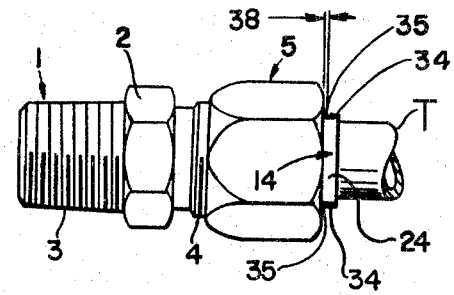
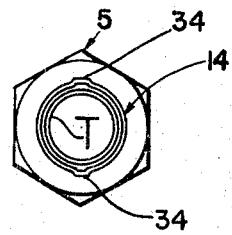
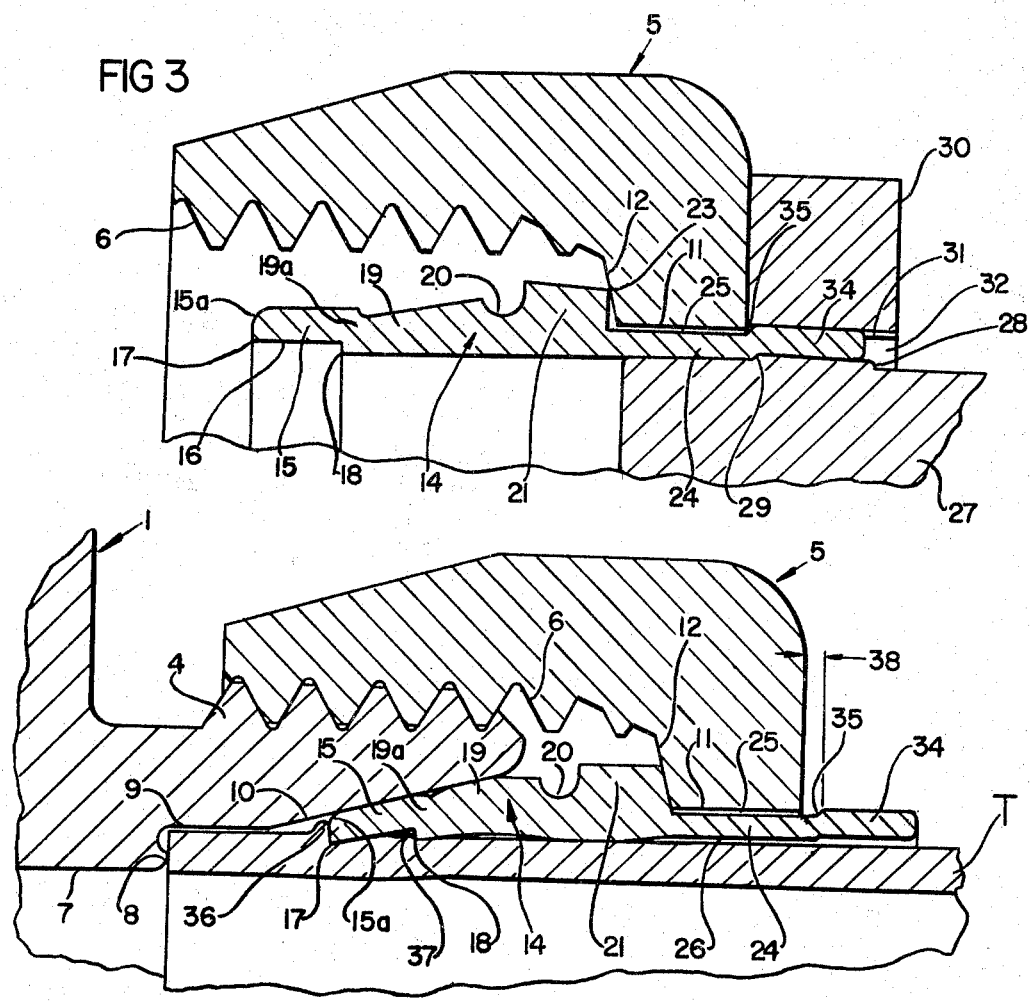
INVENTOR.
HOWARD L. SULLIVAN
BY
Oberlin, Maky & Donnelly
ATTORNEYS.

United States Patent Office 3,325,192
Patented June 13, 1967

3,325,192
FLARELESS TUBE COUPLING NUT AND FERRULE ASSEMBLY
Howard L. Sullivan, Willowick, Ohio, assignor to Parker-Hannifin Corporation, Cleveland, Ohio, a corporation of Ohio
Continuation of application Ser. No. 78,917, Dec. 28, 1960. This application Nov. 19, 1964, Ser. No. 414,499
7 Claims. (Cl. 285—93)

The present invention is a continuation of applicant's prior co-pending application Ser. No. 78,917, filed Dec. 28, 1960, now abandoned, and relates generally as indicated to a nut and ferrule assembly for a flareless tube coupling of the type in which the ferrule is adapted to be radially contracted at its inner end into gripping and sealing engagement with the surface of a tube to be joined to a coupling body having threaded engagement with the nut and having a tube end-receiving bore and a frusto-conical cam surface against which the inner end of the ferrule is urged for contraction as aforesaid when the nut is screwed tightly onto the body. More particularly, the present invention relates to a nut and ferrule assembly in which these two parts of a flareless tube coupling are secured together but yet the nut is free at all times to be turned with respect to the ferrule to minimize tendency of turning or torquing the tube when the nut is screwed onto the coupling body. This invention also relates to a nut and ferrule assembly of the type in which the ferrule, between its ends, is deformed by the nut into frictional engagement with the tube in a manner so as to effectively dampen vibrations in the tube at a zone axially spaced from the zone where the ferrule is in gripping and sealing engagement with the tube.

It is a principal object of this invention to provide a simple form of three-piece flareless tube coupling viz., a body, a nut, and a ferrule characterized in that the nut and the ferrule are preassembled to eliminate need for separately handling and stocking nuts and ferrules and further assuring that the ferrule is in proper endwise position in the nut so that its tube gripping and sealing end confronts the flare mouth or cam surface of the body when the nut is screwed onto the body, the flareless tube coupling herein further being characterized in that the coupling parts are so formed that tightening of the nut first effects axial advance of the ferrule against the flare mouth of the body to cause radial contraction of the front end of the ferrule into gripping and sealing engagement with the tube and then effects radial contraction of the mid-portion of the ferrule into vibration damping contact with the tube with accompanying axial advance of the nut with respect to the retaining shoulder of the ferrule to provide a visual signal that the nut has been tightened to the proper extent.

It is another object of this invention to provide a flareless tube coupling nut and ferrule assembly in which the nut and ferrule are provided with radially overlapping pressure shoulders through which the ferrule is urged axially into the flare mount of the tube coupling body for contracting its inner end into gripping and sealing engagement with the tube and through which radial contraction of the mid-portion of the ferrule is effected for providing a vibration damping grip of the tube at a zone axially spaced from the tube gripping and sealing zone, the ferrule being further characterized in that it has a tubular outer portion extending through the nut which is radially enlarged at circumferentially spaced narrow zones to provide relatively abrupt retaining shoulders which, together with the aforesaid pressure shoulder of the ferrule, straddle an inturned flange of the nut.

It is another object of this invention to provide a novel set of tools for thus securing a tube coupling nut and ferrule together while preserving freedom of relative turning of the nut and ferrule.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a side elevation view of a completed flareless tube coupling assembly utilizing the present invention;

FIG. 2 is an end elevation view of the flareless tube coupling assembly as viewed from the right-hand side of FIG. 1;

FIG. 3 is a much enlarged fragmentary radial cross-section view showing the method and the set of tools for assembling the tube coupling nut and ferrule together; and FIG. 4 is a similar enlarged fragmentary radial cross-section view showing the fully assembled condition of the coupling parts with the ferrule contracted at its inner end to make firm gripping and sealing engagement with the tube and sealing engagement with the flare mount of the coupling body and contracted at its mid-portion into vibration damping engagement with the tube at a zone axially spaced from the tube gripping and sealing zone.

Referring now more particularly to the drawing, the flareless tube coupling herein comprises a body 1 provided, for example, with a wrench-engaging portion 2 between its ends and tapered pipe threads 3 or the like, and uniform pitch diameter male threads 4 at its respective ends, and a nut 5 formed with female threads 6 engaged with the threads 4.

As best shown in FIG. 4, the body 1 is formed with a bore 7 therethrough and internal abutment shoulder 8 for an end of a tube T, a counterbore 9 adjacent said shoulder 8, and a countersink or flare mouth 10 which, as hereinafter explained, constitutes a cam surface.

On the other hand, the internally threaded nut 5 is formed with a bore 11 through which the tube T extends, and with an inturned flange providing the internal shoulder 12 which preferably is tapered as shown.

Between the body 1 and nut 5 and surrounding the tube T and disposed to engage the flare mouth 10 of the body 1, and the tapered internal shoulder 12 of the nut 5 is a sleeve or ferrule 14.

As best shown in FIG. 3, the forward end portion 15 of the ferrule 14 is substantially cylindrical having substantial length and a radiused outer corner 15a which initially is adapted to engage the flare mouth 10. The cylindrical portion 15 has a counterbore 16 which provides two radially offset and axially spaced apart sharp corners 17 and 18 which, as hereinafter explained, are adapted to bite into the surface of the tube T and to plow up ridges or shoulders of the tube metal so to provide fluid seals and strong holding shoulders which effectively resist pull-out of the tube T from the coupling assembly after the nut 5 has been tightened as in FIG. 4.

Adjacent the cylindrical portion 15 of the ferrule is an intermediate tapered portion 19, said taper being less than the taper of the flare mouth 10, the latter preferably being about 12° and the taper of the intermediate portion 19 peferably being 10°. The small end of the tapered portion 19 is of smaller diameter than the cylindrical portion 15 and the large end of the tapered portion 19 is of greater diameter than the cylindrical portion 15. As evident, the small end of the tapered portion 19 in effect provides a neck portion 19a adjacent the cylindrical portion 15 about which the cylindrical portion 15 pivots as it is deformed by the body taper 10.

Adjacent the thick end of the tapered portion 19 the ferrule 14 is formed with a peripheral groove 20 which provides another neck portion and with a radially enlarged head or flange portion 21, the outer surface of which is tapered in a radially inward and axially outward direction as shown in FIG. 3. The annular outer or rear face of the flange or head 21 is preferably perpendicular to the axis of the ferrule 14 so that only the outer corner 23 thereof is initially in line contact wth the internal tapered shoulder 12 of the nut 5 at a diameter which is preferably greater than the diameter of contact of the rounded corner 15a at the inner end of the ferrule with the flare mouth 10.

Extending axially outwardly or rearwardly from the head 21 and axially beyond the rear end face of the nut 5 is the tubular tail 24 of the ferrule 14 which is manufactured in cylindrical form of outside diameter just a few thousandths of an inch less than the diameter of the nut bore 11, whereby to provide a radial clearance 25 as shown. The inside diameter of the ferrule tail 24, and the tapered portion of the ferrule inside the head 21 and the tapered portion 19 is made to uniform diameter slightly larger than the outside diameter of the tube T with which the ferrule 14 is adapted to be used, thereby providing an initial small radial clearance 26 of the ferrule 14 with the tube T.

In order to secure the ferrule 14 and nut 5 together while yet not interfering with free turning of the nut 5 with respect to the ferrule 14, there is provided a cylindrical male tool member 27 which is of diameter substantially equal to the inside diameter of the ferrule tail 24. Spaced axially from the end of the male tool member 27 are a pair of diametrically opposite protuberances 28 which, for example, in the case of a flareless tube coupling for ½" diameter tube T project radially a distance of only about .010". Moreover, the circumferential width of such protuberances is relatively small, viz., only about ⅓₂". The leading end 29 of each protuberance 28, while being slightly radiused, as shown, is disposed at quite an abrupt angle. Placed around the tail end 24 of the ferrule 14 is an endless female die or tool member 30 which is formed with diametrically opposite axial grooves 31 that are radially spaced from, but complemental with, the respective protuberances 28 of the male tool member 27. The grooves 31 are formed in the bore 32 of the female tool member 30 which is of diameter substantially equal to the outside diameter of the tail end 24 of the ferrule 14.

Thus, with the ferrule 14 inserted into the nut 5 with the tail end 24 thereof projecting through the nut as shown in FIG. 3, the female tool member 30 is placed against the rear end face of the nut 5 and the male tool member 27 is inserted into the tail end 24 of the ferrule 14 while the ferrule is backed up or held against axial movement with respect to the nut. Then the male tool member 27 is forced axially into the ferrule 14 to the position shown in FIG. 3 whereby the protuberances 28 thereof will radially outwardly deform the portions 34 of the ferrule tail 24 to form the relatively abrupt holding or retaining shoulders 35 which radially overlie the rear end face of the nut 5 and thereby serve to lock the ferrule 14 and nut 5 against axial separation, since in that condition, the inturned flange of the nut is straddled by the head 21 and the holding shoulders 35 of the ferrule 14. While the male tool member 27 was previously described as having only two protuberances 28 for forming just two radially enlarged extensions or retaining shoulders 35 in the ferrule 14, it should readily be apparent that three or more of such retaining shoulders 35 could be formed, equally spaced around the periphery of the ferrule tail 24, if desired. It is to be noted that the circular configuration of the male tool member 27 and the circular bore 32 of the female tool member 30 serve to retain the tail 24 of the ferrule 14 in truly circular form so that there will be no binding between the nut bore 11 and the ferrule tail 24 and between the ferrule bore and the tube T.

Now, when it is desired to couple a tube T, the nut 5 and ferrule 14 assembly may be screwed onto the coupling body 1 whereupon the tube T to be coupler may be inserted through the ferrule 14 with its end in abutting engagement with the abutment shoulder 8. When the nut 5 is tightened, the axial force exerted thereby around the line contact 23 of the head 21 with the internal shoulder 12 will cause the ferrule 14 to be axially advanced into the flare mouth 10 thereby causing the enlarged cylindrical end portion 15 to be progressively deformed as a cantilever beam about the neck 19a to frusto-conical form as clearly shown in FIG. 4. First, the sharp corner 17 contacts the surface of the tube T to progressively build up a holding shoulder 36 of tube metal while at the same time the end of the tube T is firmly pressed against the internal shoulder 8 in the body 1. Finally, before the nut 5 has been tightened to the extent shown in FIG. 4, the other sharp corner 18 will, likewise, become embedded in the surface of the tube T to create a second sealing and holding shoulder 37. However, at that time the entire cylindrical end portion 15 of the ferrule 14 has been deformed to frusto-conical form and the intermediate tapered portion 19 has arched slightly outwardly and advanced into contact with the tapered flare mouth 10, whereby very little additional radial contraction of the initially cylindrical portion 15 will be effected thereafter even by application of substantially increased tightening torque on the nut 5.

When the nut 5 has been tightened to this extent there has been a substantial force coupling composed of radially offset axial forces effective to turn the head 21 inwardly about its zone 23 of engagement with the tapered internal shoulder 12 of the nut 5 whereby the yielding or deformation of the ferrule 14 at the region of the peripheral groove 20 will cause the bore portion in the head 21 to contract radially to provide a gradually releasing frictional grip on the outer surface of the tube T to effectively resist or dampen vibrations. This prevents vibrations from causing failure of the tube T at or adjacent the holding shoulders 36 and 37.

The apex angles or angles of taper of the flare mouth 10 and of the internal shoulder 12 are of considerable importance to proper operation of the coupling in that to effect desired biting action of the corners 17 and 18 into the surface of the tube T to create the sealing and pull-out resisting ridges or shoulders 36 and 37, requires a wedge-taper of the flare mouth 10 so that there will be a substantial force multiplication whereby a predetermined axial force on the ferrule 14 will result in a much greater radial inward force component to cause contraction while the attitude of the corners 17 and 18 is such as to induce a plowing action which progressively builds up the shoulders 36 and 37 as the ferrule 14 is thus axially advanced and radially contracted at its inner end. By the same token, the internal shoulder 12 in the nut 5 is tapered to set up a radial wedge angle relationship so that as the coupling is being made up large axial forces may be exerted through the nut 5 without prematurely contracting the mid-portion of the ferrule 14. This relationship at the head 21 and shoulder 12 induces the aforedescribed swinging or tipping action of the head 21 about the radially outer zone 23 of axial force application with respect to an inner zone of axial reacting forces. Accordingly, the ferrule 14, by the time it has been properly contracted into biting and sealing engagement with the tube T, is placed under a high degree of axial compression which is sufficient to cause a radial contraction at the groove 20 thereof and consequent swinging in of the adjacent portion of the head 21 about the radially outer zone 23 of axial force application on said head 21.

By again referring to FIG. 4, it will be noted that under normal tightening, the ferrule head 21 is swung or tipped so that the mid-portion of the ferrule 14 is contacted into vibration dampening contact wtih the tube T and the head 21 is tipped to such an extent that the outer end face coincides with the shoulder surface 12 of the nut 5 so as to establish surface contact therebetween. This eliminates the couple action referred to above so that further tigheening of the nut 5 results in substantially no additional tipping or swinging in of the head 21. The bringing about of such surface contact has the effect of discontinuing or eliminating such tipping and thus limits the amount of contraction of the mid-portion of the ferrule against the tube so that the tube will be gripped tightly enough to prevent vibration strains on the tube from reaching the sealing edges 17 and 18 but not tightly enough to objectionably contract the tube or grip it so firmly that stress concentrations will cause early failure at this region due to vibration induced stress concentrations. It will be noted that with the front and mid sections of the ferrule 14 contracted against the tube T, the ferrule has a somewhat arched configuration and the contact of the body taper 10 with the intermediate portion 19 prevents outward buckling of the latter. Such arching also results in a spring action tending to lock the nut 5 against loosening under vibration. From the foregoing it is clear that where the tube end is cut off cleanly and squarely there may be a fluid-tight seal effected between the end of the tube T and the internal shoulder 8 of the body 1. Further seals are obtained where the corners 17 and 18 of the ferrule 14 are embedded in the surface of the tube T and where the relatively initially wide cylindrical surface 15 of the ferrule 14 is in intimate contact with the flare mouth 10. Such wide area contact precludes gouging or damage to the flare mouth 10 by the ferrule 14, whereby the body 1 may be repeatedly assembled and disassembled. It is to be noted that when the coupling is assembled as shown in FIG. 4, the outer end face of the nut 5 will, due to the deformation of the head 21 move slightly forward with respect to the holding or retaining shoulders 35 and, thus, when it is desired to disassemble the coupling, the nut 5 may be initially loosened until the junction of its rear face with the bore 11 engages the holding shoulders 35, whereupon continued unscrewing of the nut 5 will first release the springy, wedge-engagement of the ferrule 14 with the flare mouth 10 and thereafter axially withdraw the ferrule 14 and tube T from the coupling body 1. Although the ferrule 14 and nut 5 are thus secured together for convenience in handling and in assembly and disassembly of the coupling, they can be detached from one another, if so desired. The portions 34 project radially so little beyond the nut bore 11 that they are capable of yielding without damaging either the nut 5 or ferrule 14 upon exertion of sufficient axial separating froces thereon. In any event, once the coupling has been assembled, the ferrule 14 becomes a more or less permanent part of the tube T and the nut 5 is retained on the ferrule 14 by portions 34 in operating position ready for screwing onto the threads 4 of the body 1 upon insertion of the end of the tube T into the body 1 against the abutment shoulder 8.

By way of example, the body 1, nut 5, and ferrule 14, may be fabricated as of commercial brass for use with conventional copper tubing such as is used in automotive fluid systems and in hydraulic systems in the machine tool art. Of course, other materials may be used depending upon the service to which the coupling assembly is to be put, and according to the material from which the tube T is made. Thus, for high pressure systems or systems handling corrosive fluids, the tube T may be of stainless steel, or the like, and in that case the body 1, nut 5, and ferrule 14 likewise, will be made of corrosion-resisting material but, preferably, at least the ferrule 14 will be material which is harder than the tube T, so that the sharp corners 17 and 18 will readily bite into the surface of the tube T to plow up the necessary holding ridges 36 and 37.

By way of further example, couplings for 1/8", 3/16", 1/4", 5/16", 3/8", 1/2", 5/8", 3/4", and 1" tubing made in accordance with this invention should have the following dimensions:

Taper of flare mouth 10 with respect to axis of body 1, 10° to 15°, preferably 12°.
Taper of outer surface of head 21, approximately 5° to 7°.
Taper of internal shoulder 12, 10° to 15°, preferably 12°.
Taper of ferrule from neck 19a to groove 20, preferably about 10° (usually 2° less than flare mouth 10).
Length (end to neck 19a) to thickness ratio of cylindrical offset end of ferrule 14, approximately 3:1 to 4:1.
Ratio of thickness at cylindrical portion of ferrule 14 to thickness at neck 19a, approximately 1:1.
Ratio of thickness of ferrule at groove 20 to thickness at neck 19a, approximately 1:1 to about 1.5:1.
Ratio of radial distance from tube T to outer corner of head 21 to radial distance from tube T to corner 15, approximately 1.5:1 to about 2.2:1.
Radial clearance from tube T to counterbore 16, approximately .007" for 1/8" and larger sizes up to about .012" for 1" size.
Ratio of length of cylindrical portion 15 with tapered portion 19, approximately 1:1 to about 1.5:1.

The foregoing relationships have been found well suited for joining commercial grades of copper tube T to couplings comprising bodies 1, nuts 5, and ferrules 14 made as of brass.

The radially offset relation of the axial pressure and reacting forces on the head 21 effects yet another important result and that is that there is resilient bending or swinging of the head 21 in a counterclockwise direction as viewed in the drawings.

Upon loosening of the nut there will be a slight bending or swinging of the sleeve head in the opposite, i.e., clockwise direction within the elastic limit of the head 21. Thus, there is a resilient contact of the head 21 with the nut 5 for providing an additional spring-like action to resist loosening of the nut 5 by vibration or otherwise.

It is to be noted further that the tail 24 of the ferrule 14 provides a relatively great length of support for the tube T axially outwardly of the zone of vibration-damping grip within the head 21. Moreover, the enlargements 34 provide diametrically opposite clearances with the tube T to eliminate continuous stress concentration lines around the tube at the end of the tail 24 to thereby further enhance by the vibration-resisting characteristics of the tube coupling assembly. Yet another notable feature is that even though the nut 5 is slightly loosened inadvertently the spring-back of the head 21 and of the arched tapered portion 19 precludes retraction of the wedged portion 15 from the flare mouth 10. Moreover, the axial clearance 38 may be conveniently used as a gauge means or visual signal to indicate that the head 21 has been deformed to the desired extent to establish the vibration damping grip of the tube T at the mid-section of the ferrule 14. In other words, originally, as shown in FIG. 3, there is no appreciable axial clearance between nut 5 and shoulders 34 and the axial clearance 38 is created only after both the fluid-tight connection of the tube T with the coupling assembly and the vibration damping contact within head 21 have been established.

Other modes of applying the principle of the invention may be employed, change being made as regards the details described, provided the features stated in any of the following claims, or the equivalent of such, be employed.

I therefore particularly point out and distinctly claim as my invention:

1. A tube coupling assembly comprising a body member, nut means in threaded engagement with said body member, said nut means and body member defining therebetween a tube-end receiving cavity including an annular space around a tube in such cavity, a metal sleeve surrounding said tube within such annular space, said body member having a tapered wall portion, said sleeve having a relatively thin forward end portion and a radially thickened intermediate portion, said nut means having a radially inwardly extending shoulder initially in contact with only the radial outermost part of said thickened intermediate portion through which axial compression force is imposed during tightening of said nut means to force said forward end portion into contact with said tapered wall portion for contracting said forward end portion into fluid-tight gripping engagement with said tube at a zone axially spaced from said intermediate thickened portion during which there is substantially no deformation of said thickened intermediate portion, said sleeve also having an extension projecting axially from said thickened intermediate portion outwardly through a bore in said nut means, said extension having a radial enlargement axially outwardly of said nut means to form a retaining shoulder for holding said nut means and sleeve together, said nut means through continued tightening being operative only after such fluid-tight gripping engagement has been established to effect deformation of said thickened intermediate portion to cause radial contraction of said sleeve in the region of said thickened intermediate portion into vibration damping engagement with said tube, said nut means advancing axially with respect to said retaining shoulder only during deformation of said thickened intermediate portion as aforesaid to provide a visual indication both that such fluid-tight gripping engagement has been established and of the extent of fluid damping engagement of said sleeve with said tube.

2. The tube coupling assembly of claim 1 wherein said forward end portion of said sleeve has a sharp corner axially spaced from said thickened intermediate portion which bites into the surface of said tube during the initial tightening of said nut means to establish such fluid-tight gripping engagement.

3. The tube coupling assembly of claim 1 wherein said sleeve is formed with an outer peripheral groove axially inwardly adjacent said thickened intermediate portion, and wherein said thickened intermediate portion has a radial outer edge which is engaged by said radially inwardly extending shoulder on said nut means to effect swinging of said thickened intermediate portion to contract said sleeve in the region of said peripheral groove and thickened intermediate portion subsequent to the formation of such fluid-tight gripping engagement between said sleeve and tube.

4. The tube coupling assembly of claim 3 wherein said thickened intermediate portion has a rear face which is perpendicular to the axis of said sleeve, and said shoulder on said nut means substantially radially overlaps said rear face but tapers radially inwardly away from said rear face whereby only the outer edge of said rear face is initially in line contact with said shoulder of said nut means, said nut means being adapted to deform said thickened intermediate portion and advance axially with respect to said retaining shoulder to provide a visual indication as aforesaid until substantial surface contact is established between said rear face and said shoulder on said nut means.

5. The tube coupling assembly of claim 1 wherein said extension is radially enlarged at one circumferentially narrow zone axially outwardly of said nut to a dimension therefrom to the diametrically opposite side of said extension just slightly larger than the diameter of said bore in said nut means, whereby said nut means and sleeve are axially retained together as aforesaid, said radial enlargement being adapted to yield to generally non-circular cross section to enable detachment of said sleeve from within said nut means upon exertion of axial separating forces thereon.

6. The coupling of claim 5 wherein said extension is also radially enlarged at least at one other circumferentially narrow zone spaced from said one zone.

7. The tube coupling assembly of claim 5 wherein said extension is also enlarged radially at two other circumferentially narrow zones uniformly spaced from said one zone.

References Cited
UNITED STATES PATENTS

| | | | |
|---|---|---|---|
| 1,959,607 | 5/1934 | Anderson | 285—379 X |
| 2,059,920 | 11/1936 | Weatherhead | 285—382.7 X |
| 2,394,351 | 2/1946 | Wurzburger | 285—382.7 X |
| 2,497,273 | 2/1950 | Richardson | 285—382.7 X |
| 3,101,205 | 8/1963 | Benham | 285 |
| 3,120,969 | 2/1964 | Schmohl | 285—382.7 X |
| 3,219,367 | 11/1965 | Franck | 285—382.7 X |

CARL W. TOMLIN, *Primary Examiner.*

THOMAS F. CALLAGHAN, *Examiner.*